United States Patent Office 2,841,041
Patented July 1, 1958

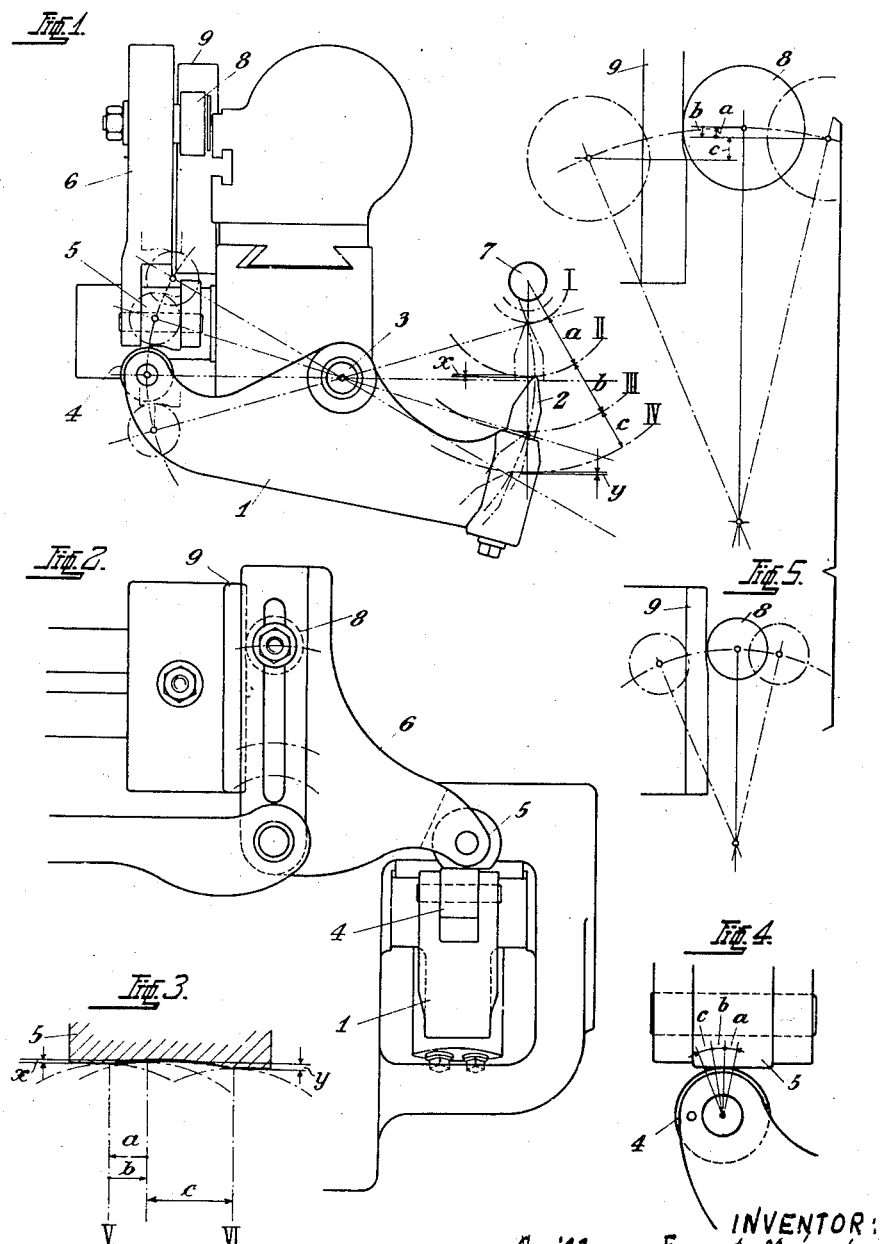

2,841,041
RECTIFYING DEVICE FOR AUTOMATIC LATHES

Guillaume Ernest Mégel, Moutier, Switzerland, assignor of fifty percent to Henri Mancia, Moutier, Switzerland Application June 17, 1954, Serial No. 437,454

Claims priority, application Switzerland June 18, 1953

1 Claim. (Cl. 82—28)

This invention relates to motion compensating means for use with automatic lathes.

It is an object of the present invention to provide means facilitating control and regulation of the accuracy of operation of a lathe having a movable, cam-actuated headstock in a simple and highly efficacious manner by eliminating the possibility of displacement of said headstock in any manner other than as prescribed by the characteristics of said cam.

Another object of the present invention is to provide means ensuring full compensation for motion differentials arising between the headstock of a lathe and the control means therefor, whereby the displacements of the headstock will be exactly equal to the displacements intended to be engendered by said control means.

Still another object of the present invention is to provide means contributing to an improved and efficient compensating or rectifying motion transmitting system for use with the movable headstock or tailstock of a lathe, through which system inaccuracies in the transmission of movements from a cam to said head- or tailstock are obviated to enable precise machining of a workpiece to be effectuated.

More particularly, in heretofore known lathes having a movable headstock or tailstock it is customary to use, for imparting axial displacements to said head-stock or tailstock, either a bell-shaped cam or a plane cam member or plate in such a manner as to counteract the force of a return spring or a counterweight acting on said head- or tailstock. Due to the greater inherent complexity of the bell-shaped cams, the plane cam plates have been generally preferred.

In the latter form of construction, the cam plate is usually rotated in a plane substantially perpendicular to the axis of rotation thereof, while for imparting to the headstock the advance and return movements which are required by the type of work being done, an arrangement of two pivotal levers disposed in different planes is employed. The axes of rotation of these levers lie at right angles to one another.

This arrangement is, however, subject to the disadvantage that due to the fact that one of the levers feels or rides over the cam plate for effecting the advance movements of the headstock, said one lever does not move linearly with respect to the cam plate, but rather moves in an arcuate path. This causes the axial movements of the headstock to differ from the corresponding radial differences existing between the various surface portions of the cam plate.

It is, therefore, another primary object of the present invention to eliminate this disadvantage by means of a correcting or compensating element which is connected to one of the motion transmitting levers, and therethrough to said headstock, at the junction of said one lever with the other lever. The arrangement includes the provision of a suitably profiled guide or bearing surface on said one lever and facing said other lever at said junction.

The characteristics of said surface correspond to the errors in transmission arising from the pivotal disposition and motion of said other or cam-contacting lever. The latter is, of course, provided at said junction with a jaw-shaped gripper or a roller which contacts and rides over said profiled bearing surface.

These and other objects of the invention will become further apparent from the following detailed description, reference being made to the accompanying drawing, showing a preferred embodiment of the invention.

In the drawing:

Fig. 1 is a front elevational view of the lever mechanism and the compensating means embodying the present invention;

Fig. 2 is a side elevational view of the mechanism of Fig. 1; and

Figs. 3 to 5 show diagrammatically and on a greater scale the profile of the compensating element.

Referring now to Fig. 1, the transmission lever 1 is provided at one end with a feeler 2 and at its other end with a roller 4. The lever 1 is pivoted intermediate its end to the lathe bed by means of a pivot member or pin 3. The roller 4 bears against a bearing or abutment member 5 of a vertical lever 6 pivotally attached to the headstock of the lathe.

A contact element 8 on the lever 6 is adapted to engage a guide bar 9 fixed to the headstock. Motion of the feeler 2 is thus transmitted to the headstock through the lever 1, the roller 4, the bearing member 5, the lever 6, the contact element 8 and the guide bar 9.

The feeler 2 contacts and rides over the cam surface of a suitable cam member (not shown) which is fixedly connected with the shaft 7. As will be readily realized, each portion of the cam surface may be thought of as being disposed at a predetermined radial distance from the center of the shaft 7. The locations corresponding to these radial distances are designated by the Roman numerals I to IV in Fig. 1.

However, due to the pivotal support of the lever 1, the tip of the feeler 2 does not travel in a linear path from one radial distance to another as it contacts the different portions of the cam surface. Rather, the path of movement of the feeler 2 is arcuate.

In general, as may be seen from Fig. 1, when the feeler moves from a cam portion at radius I to another cam portion at radius III, it is displaced a linear distance equal to $a+b$, since at locations I and III the tip of the feeler is located on a radius of the shaft 7.

When the feeler, however, moves from the radial location I to the radial location II, it is displaced a linear distance of $a-x$. Movement of the feeler from the radial location II to the radial location III causes a linear displacement of $b+x$, while movement of the feeler from radial location III to radial location IV results in a linear displacement of $c-y$.

Compensation or rectification for these small differentials is obtained by automatically acting compensation means. In accordance with the invention, such means include a suitable bearing element or member 5 attached, as set forth above, to one end of the vertical lever 6 and over which the roller 4 of the transmission lever 1 rides. During the transmission of motion from the feeler 2, the roller 4 moves along the bearing or slide surface of the element 5 from a point V to a point VI (see Fig. 3).

In order to obtain a compensated displacement of the headstock, the profile of the surface of the element 5 between the points V and VI is so calculated that the values $x$ and $y$ are adjusted exactly to the corresponding points, whereby an automatic compensation for these fixed differences is attained. In this manner, the axial displacements of the lathe headstock correspond exactly to the measured radial differences between the various portions of the cam surface.

The same result may be obtained by imparting to the intermediate contact member 8 of the vertical lever 6 a corresponding profile, or by replacing the roller 4 with a fixed transmission element of suitable profile characteristics. If regulation of the transmission ratio is dispensed with, then it is also possible to provide the bearing surface of guide bar 9 with a suitable profile. In any of these latter modifications, the abutment member 5 is provided with a plane contact surface.

Alternatively, of course, the compensating member can be constructed in the form of a roller or a slide member with a plane or profiled surface.

Thus, it will be seen that there has been provided, according to the invention, in a lathe having a movable headstock and a cam with cam surface characteristics corresponding to the movements to be imparted to said headstock, pivotal lever means provided with a feeler at one portion for contacting and riding over said cam surface, said lever means having another portion operatively connected to said headstock to transmit and impart to the latter movements corresponding to movements of said feeler as the same rides over said cam surface, and compensating means operatively interconnected between said other portion of said lever means and said headstock, said compensating means including a profiled bearing member and a contact element engaging and riding over said bearing member, the profile of the latter being calculated to correspond directly to and to counteract errors of transmission arising from the pivotal mounting of said lever means.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

In a lathe having a movable headstock and a cam with cam surface characteristics corresponding to the movements to be imparted to said headstock; a first lever having spaced first and second ends and mounted intermediate said ends for pivotal movement about a first axis, a feeler carried by said first lever adjacent said first end thereof for contacting and riding over said cam surface and displaceable in accordance with said characteristics of the latter along an arcuate path about said first axis, a second lever having spaced first and second ends and mounted intermediate said last-named ends for pivotal movement about a second axis oriented at right angles to said first axis, a first contact member carried by said first lever adjacent said second end thereof, a second contact member carried by said second lever adjacent said first end thereof and engaging said first contact member, a bearing member provided with a profiled contact surface and carried by said headstock, and a contact element carried by said second lever adjacent said second end thereof and engaging and riding over said profiled contact surface of said bearing member, whereby said headstock is moved in accordance with the movements of said feeler as the same rides over said cam surface, the shape of said profiled contact surface of said bearing member being predetermined to compensate for errors of transmission arising from arcuate movements of said feeler due to the pivotal mounting of said first lever, to thereby ensure that movements of said headstock correspond only to changes in linear distance between said feeler and a preselected reference portion of said cam.

References Cited in the file of this patent
UNITED STATES PATENTS

| | | |
|---|---|---|
| 1,193,909 | McKechnie | Aug. 8, 1916 |
| 1,403,480 | Blood | Jan. 17, 1922 |
| 2,368,793 | Wilson | Feb. 6, 1945 |
| 2,574,775 | Bechler | Nov. 13, 1951 |

FOREIGN PATENTS

| | | |
|---|---|---|
| 125,532 | Switzerland | May 4, 1927 |